(12) United States Patent
Jiang

(10) Patent No.: US 8,528,082 B2
(45) Date of Patent: Sep. 3, 2013

(54) SECURITY DISPOSING METHOD AND DEVICE FOR INPUT DATA

(75) Inventor: Yu Jiang, Beijing (CN)

(73) Assignee: Chongqing Shahai Information Technology Co., Ltd, Chongqing (CN)

( * ) Notice: Subject to any disclaimer, the term of this patent is extended or adjusted under 35 U.S.C. 154(b) by 671 days.

(21) Appl. No.: 12/672,506

(22) PCT Filed: Jul. 23, 2008

(86) PCT No.: PCT/CN2008/001358
§ 371 (c)(1),
(2), (4) Date: Feb. 5, 2010

(87) PCT Pub. No.: WO2009/018716
PCT Pub. Date: Feb. 12, 2009

(65) Prior Publication Data
US 2011/0099637 A1   Apr. 28, 2011

(30) Foreign Application Priority Data
Aug. 7, 2007   (CN) .......................... 2007 1 0120031

(51) Int. Cl.
*G06F 11/00* (2006.01)
*G06F 12/14* (2006.01)
*G06F 7/04* (2006.01)

(52) U.S. Cl.
USPC ................. 726/22; 726/26; 726/27; 713/165; 713/189

(58) Field of Classification Search
None
See application file for complete search history.

(56) References Cited

U.S. PATENT DOCUMENTS

| | | | |
|---|---|---|---|
| 7,328,457 B1* | 2/2008 | Mister | 726/30 |
| 2001/0025361 A1* | 9/2001 | Kim | 714/786 |
| 2003/0190041 A1* | 10/2003 | Yokota et al. | 380/44 |
| 2006/0101128 A1* | 5/2006 | Waterson | 709/212 |
| 2006/0104443 A1* | 5/2006 | Chari et al. | 380/46 |
| 2006/0112270 A1 | 5/2006 | Erez | |
| 2007/0179891 A1 | 8/2007 | Lu et al. | |
| 2007/0226784 A1* | 9/2007 | Ueda et al. | 726/5 |
| 2007/0280392 A1* | 12/2007 | De Laurentiis et al. | 375/355 |
| 2008/0044011 A1 | 2/2008 | Yoshida et al. | |
| 2010/0023750 A1* | 1/2010 | Tan | 713/150 |

FOREIGN PATENT DOCUMENTS

| | | |
|---|---|---|
| CN | 1937008 | 3/2007 |
| CN | 101008972 | 8/2007 |
| CN | 101101625 | 1/2008 |
| WO | WO 2009/018716 | 2/2009 |

OTHER PUBLICATIONS

International Search Report and Written Opinion with English Translation for PCT/CN2008/00135 Nov. 6, 2008 (mailing date), Jiang, Yu.
International Preliminary Report on Patentability with English Translation for PCT/CN2008/001358, Feb. 9, 2010 (issuance date), Jiang, Yu.

* cited by examiner

*Primary Examiner* — Nathan Flynn
*Assistant Examiner* — Trang Doan
(74) *Attorney, Agent, or Firm* — Kilpatrick Townsend & Stockton LLP

(57) ABSTRACT

A security disposing method and device for the input data involves generating an interference data according to a predefined rule when inputting the data, and mixing the input data with the interference data and sending the mixed data, and parsing out the interference data according to the predefined rule after receiving the mixed data, and separating the input data according to the parsed interference data.

12 Claims, 4 Drawing Sheets

US 8,528,082 B2

SECURITY DISPOSING METHOD AND DEVICE FOR INPUT DATA

CLAIM OF BENEFIT TO PRIOR APPLICATIONS

This application is a national stage application of PCT Patent Application PCT/CN2008/001358, entitled "A Security Disposing Method and Device for Input Data," filed on Jul. 23, 2008, which claims the benefit of Chinese Patent Application 200710120031.0, entitled "A Security Disposing Method and Device for Input Data," filed on Aug. 7, 2007. Both of the above-mentioned applications are incorporated herein by reference.

FIELD OF THE INVENTION

The present invention relates to information security, and particularly to a security processing method and apparatus for input data.

BACKGROUND OF THE INVENTION

At present, various Operating Systems (OSs) provide interfaces or mechanisms used for acquiring input data information from a user, for example, a Hook provided in the Windows operating system by Microsoft Corporation is a significant one of such interfaces, and may be used for intercepting and processing a message sent to other application program. In this case, a hacker may intercept data inputted through a data input device such as a keyboard by using various Hook interface programs at the Application Program Interface (API) layer, for the purpose of thieving important data information such as a user password. The emergence of such technologies threatens the current information security greatly.

In the prior art, some defense programs defense the Hooks by means of prohibiting the invoking of partial Hooks; or, the defense programs per se are superior Hooks, to enable obtaining in advance of any keyboard input by the user before other Hook takes effect.

However, the effect of such defense solutions in the prior art is not satisfying due to the fact that the hacker can also ensure the execution priority of a hacker program by acquiring a higher system authority, or obtain the user input in advance by using an Operating System invoking function at a lower layer.

Therefore, in view of the increasing theft of the input data information by the hacker, there is a need for a superior technical solution to protect data information inputted by the user.

SUMMARY OF THE INVENTION

An embodiment of the present invention provides a security processing method and apparatus for input data, to address at least the above problem in the prior that information may be thieved during inputting of data.

An embodiment of the present invention provides a security processing method for input data, comprising:

generating interference data using a predetermined rule when data is inputted;

mixing and sending the inputted data and the interference data;

receiving the mixed data, and parsing the interference data using the predetermined rule; and separating the inputted data from the parsed interference data.

An embodiment of the present invention further provides a security processing apparatus for input data, which may be applicable to a data processing system including a data input device and a data receiving device and may include an interference module, a sending module and a separating module.

The interference module may be adapted to generate interference data using a predetermined rule when data is inputted through the data input device.

The sending module may be adapted to mix and send the data inputted through the data input device and the interference data.

The separating module may be adapted to parse the interference data using the predetermined rule from the mixed data received by the data receiving device, and separate the inputted data from the parsed interference data.

The embodiments of the present invention provide the following beneficial effects. In the embodiments, interference data is generated using a predetermined rule when data is inputted, and the inputted data and the interference data are mixed and sent together, so that any one who intends to obtain data information illegally cannot distinguish the information inputted by the user from the large amount of information out of order. That is, the Operating System receiving the data inputted by the user receives the combination of both the interference information and the data inputted by the user through the data input device. Thus, neither of the Operating System and a program is aware of the actual keyboard input by the user. Although the information of keyboard input by the user exists in a plain text form in information transmitted, the one who intends to acquire data information illegally cannot effectively obtain the information of keyboard input due to the coverage of the great amount of interference information, so that the data inputted by the user may be hidden.

After the input data is processed as described above, a device that is qualified to receive the input data parses the interference data using the predetermined rule after receiving the mixed data, and separates the input data from the parsed interference data so that the input data may be recovered safely, as a result, any one who intends to acquire data information illegally is prevented from obtaining any data when the data is inputted, while the inputted data information may be obtained safely.

DETAILED DESCRIPTION OF THE EMBODIMENTS

Embodiments of the present invention are described below in connection with the Drawings.

Figure 1:
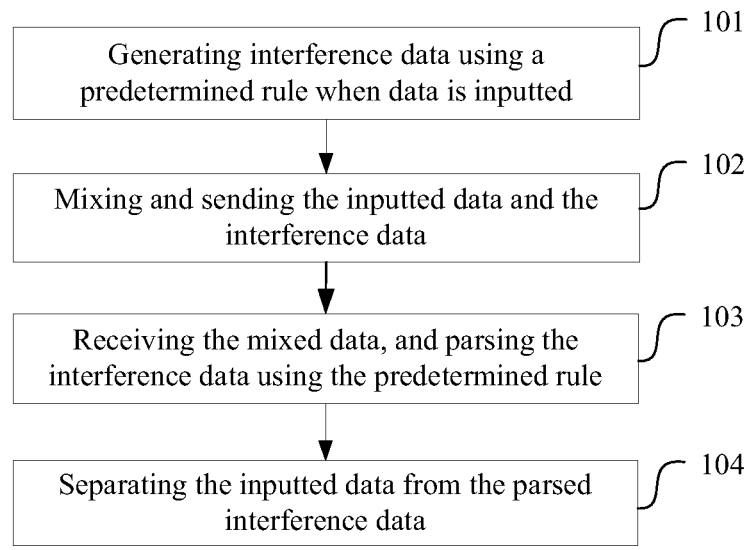
FIG. 1 is a schematic flow diagram showing the implementation of a security processing method for input data according to an embodiment of the present invention.

FIG. 1 is a schematic flow diagram showing the implementation of a security processing method for input data, and the method includes:

Process 101: generating interference data using a predetermined rule when data is inputted;

Process 102: mixing and sending the inputted data and the interference data;

Process 103: receiving the mixed data, and parsing the interference data using the predetermined rule; and Process 104: separating the inputted data from the parsed interference data.

Typically, an input device for inputting a data is provided with an Operating System such as the Windows Operating System used for executing the data processing, and the most common data input device may be, for example, a Personal Computer (PC). Mixing and sending the inputted data and the interference data refers to mixing the inputted data and the interference data and then sending the mixed data to the Operating System for processing. Particularly, in the present process, specific data may be generally inputted by a user through a keyboard of the PC, and various processing on the data may be performed via windows in the Operating System. The window for receiving the user input obtains merely the combination of both the interference data information and the data inputted by the user through the keyboard. That is, so far, a program at the client PC, including the receiving window, may be prevented from being aware of the actual keyboard input by the user. As described in the principle of the Hooks, although the information of the keyboard input by the user exists in a plain text form in information transmitted, a hacker cannot effectively obtain the information of the input data due to the coverage of the great amount of interference information, so that the data inputted by the user through the keyboard may be hidden.

Figure 2:
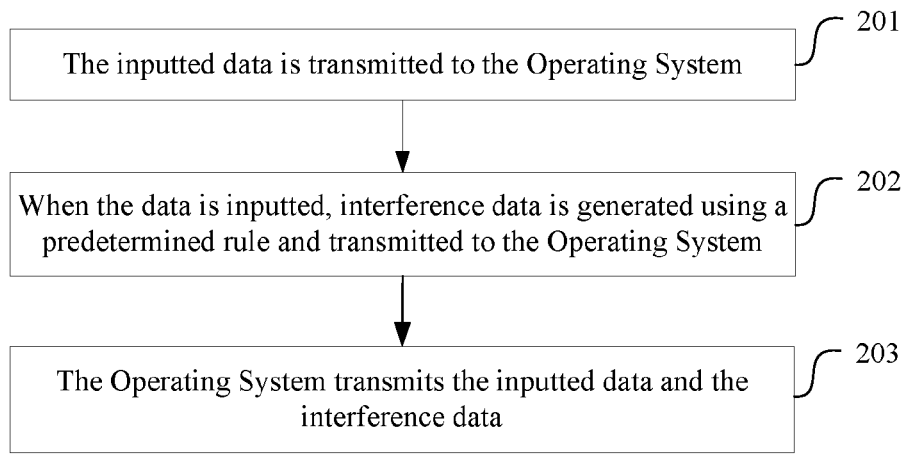
FIG. 2 is a schematic diagram showing the mixing and sending of the input data and the interference data according to an embodiment of the present invention.

FIG. 2 is a schematic diagram showing the mixing and sending of the input data and interference data. As shown, the implementation of generating interference data using a predetermined rule when data is inputted and mixing and sending the inputted data and the interference data may include the following processes.

Process 201: The inputted data is transmitted to the Operating System.

Process 202: When the data is inputted, interference data is generated using a predetermined rule and transmitted to the Operating System.

Process 203: The Operating System transmits the inputted data and the interference data.

As can be seen from the above, with the use of the method, the Operating System obtains the mixed data, and even if the mixed data is intercepted illegally, information of the data inputted by the user cannot be obtained from the mixed data.

To effectively hide the input information in the interference information, the rate of inputting the interference data into the Operating System may be larger than the rate of inputting the input data into the Operating System, e.g. much larger than the rate of inputting data by an ordinary user using the keyboard.

The further improve the security, the method may further include:

obtaining hardware information and/or input time of the input device when data is inputted;

generating interference data using a predetermined rule according to the hardware information and/or input time of the input device;

mixing and sending the inputted data and the interference data;

sending the hardware information and/or input time of the input device when the data inputting is completed; and after the mixed data and the hardware information and/or input time of the input device is received, parsing the interference data using the predetermined rule according to the hardware information and/or input time of the input device.

It will be appreciated that the present process is not limited to the hardware information and/or input time, that is, the interference data may be generated by using selected random and unpredictable variables in connection with the predetermined rule to further enhance the security. For example, since the time when the user inputs the data is irregular, if the interference data is generated using the time information, the interference data cannot be parsed due to the random of the time information even if the rule used for generating the interference information is obtained.

When an authorized receiver is aware of the rule used for generating the interference data and the variable (e.g. the input time) used for generating the interference data in connection with the rule, it is possible for the authorized receiver to separate the input data from the parsed interference data, for example, by comparing the parsed interference data with the mixed data and removing the data same as the interference data to obtain the input data.

An embodiment of the present invention further provides a security processing apparatus for input data, the implementation of which is described below in connection with the Drawings.

Figure 3:
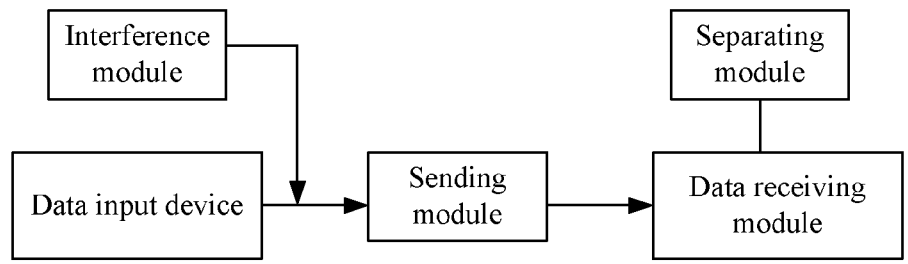
FIG. 3 is a schematic diagram showing the structure of a security processing apparatus for input data according to an embodiment of the present invention.

FIG. 3 is a schematic diagram showing the structure of a security processing apparatus for input data, which may be applicable to a data processing system including a data input device and a data receiving device and may include an interference module, a sending module and a separating module.

The interference module may be adapted to generate interference data using a predetermined rule when data is inputted through the data input device.

The sending module may be adapted to mix and send the data inputted through the data input device and the interference data.

The separating module may be adapted to parse the interference data using the predetermined rule from the mixed data received by the data receiving device, and separate the inputted data from the parsed interference data.

In an embodiment, the data input device may be provided with an Operating System for data processing, the sending module may be further adapted to mix the data inputted by the data input device and the interference data and send the mixed data to the Operating System.

The data input device may be provided with an Operating System for data processing, and the sending module may include a data transmission unit and an interference data transmission unit.

The data transmission unit is adapted to transmit to the Operating System the data inputted through the data input device.

The interference data transmission unit is adapted to transmit the interference data generated using a predetermined rule to the Operating System.

The Operating System is adapted to send the inputted data and the interference data.

In an embodiment, the rate of inputting the interference data by the interference data transmission unit to the Operating System may be larger than the rate of inputting the input data by the data transmission unit to the Operating System.

The security processing apparatus may further include an acquiring module adapted to acquire hardware information and/or input time of the data input device when input data is inputted through the data input device.

The interference module may be further adapted to generate the interference data using a predetermined rule according to the hardware information and/or input time of the data input device.

The sending module may be further adapted to send the hardware information and/or input time of the data input device when the data inputting is completed.

The separating module may be further adapted to parse the interference data using the predetermined rule according to the hardware information and/or input time of the input device after receiving the mixed data and the hardware information and/or input time of the input device.

The separating module may include a parsing unit, a comparing unit and a separating unit.

The parsing unit is adapted to parse the interference data from the mixed data received by the data receiving device using the predetermined rule.

The comparing unit is adapted to compare the parsed interference data with the mixed data.

The separating unit is adapted to obtain the input data by removing the data same as the interference data identified by the comparing unit.

The present invention is further elaborated by way of another example.

Figure 4:
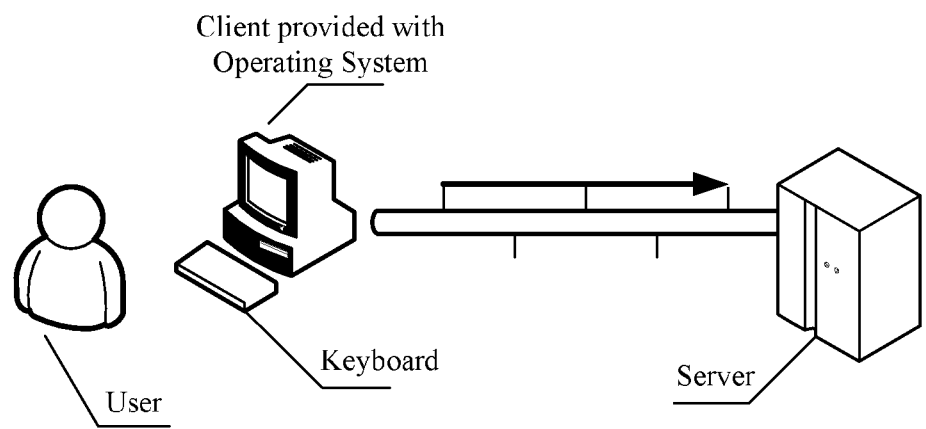
FIG. 4 is a schematic diagram showing the environment of security processing of the input data according to an embodiment of the present invention.

FIG. 4 is a schematic diagram showing the environment of security processing of the input data. As shown, in the environment, a data input device may be a keyboard through which a user may input data, or a client for data processing on which an Operating System is installed, with the Operating System being used for performing various processing on the data. For the sake of understanding, various specific data operating in the Operating System may be described through windows. It will be appreciated that many other forms of data input devices, such as a hand writing keyboard and a server, are possible and not limited to those shown in the embodiments. The data receiving device may be, but not limited to a server in the Internet, and the user input data is intended to reach the server. In principle, it will be appreciated to those skilled in the art that the data receiving device may be other device, entity or system on the client that requires the user input data.

Thus, the embodiment of the present invention relates to a method with which the input data at a client may be safely transferred to a party intending to receive the input data, such as a server, without being intercepted by a hacker at the client through Hook functions. Accordingly, in the present embodiment, the described procedure may generally include: inputting data by a user through a keyboard; transmitting the data to the Operating System; and processing and sending the data to the desired receiving server by the Operating System.

The present invention is described below by illustrating the details of the above procedure.

Figure 5:
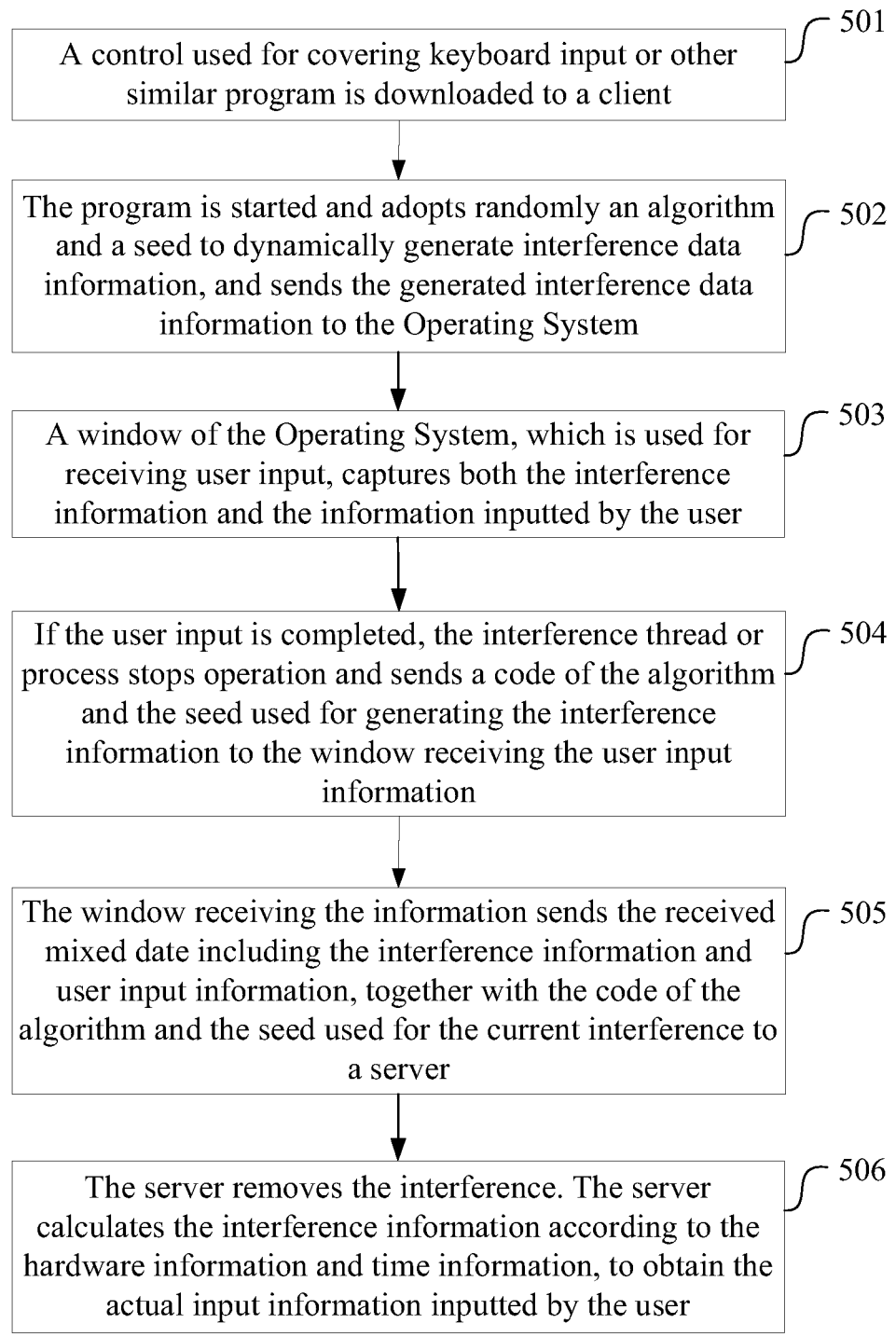
FIG. 5 is a schematic diagram showing the implementation of security processing of the input data according to an embodiment of the present invention.

FIG. 5 is a schematic diagram showing the implementation of security processing of the input data, and the implementation may include the processes below.

Process 501: A control used for covering keyboard input or other similar program is downloaded to a client.

Interference data may be generated in various manners, and is described as being generated by way of a program in the present embodiment. The program may be delivered through a WEB control or any other manners so that the program may be ran on a client.

Process 502: The program is started and adopts randomly an algorithm and a seed to dynamically generate interference data information, and sends the generated interference data information to the Operating System.

The present process may include sub-processes as follows.

Sub-process 1: Hardware information and/or time information of the local client is obtained as the most fundamental seed and a calculation result is obtained using an algorithm with a predetermined rule based on the seed.

Sub-process 2: Based on the calculation result, a current interference algorithm and a seed for the interference algorithm are determined Sub-process 3: The interference algorithm is carried out to generate interference information, and the generated interference information is inputted to a lower layer of the Operating System at a rate much higher than the keyboard input rate of an ordinary user.

Sub-process 4: The interference information varies along time according to the algorithm and is sent out continuously, until an interruption occurs due to a request by the user or any other incident such as a timeout.

Process 503: A window of the Operating System, which is used for receiving user input, captures both the interference information and the information inputted by the user.

In the present process, the window for receiving the user input obtains the combination of both the interference information and the keyboard input by the user. So far, no program at the client, including the receiving window, is aware of the actual keyboard input by the user. Although the information of the keyboard input by the user exists in a plain text form in the transmitted information, a hacker cannot effectively obtain the information of the input data due to the coverage of the great amount of interference information, so that the data inputted by the user through the keyboard may be hidden.

Process 504: If the user input is completed, the interference thread or process stops operation and sends a code of the algorithm and the seed used for generating the interference information to the window receiving the user input information.

The present process may include sub-processes below.

Sub-process 1: The user may end the operation of the control by using a special keyboard input such as the key "Enter" or clicking via a mouse, and initiate the operation of submitting the information inputted.

Sub-process 2: The control sends the previous collected hardware information and time information of the client to the window receiving the user input information in a predefined form.

Process 505: The window receiving the information sends the received mixed date including the interference information and user input information, together with the code of the algorithm and the seed used for the current interference, to a server intending to receive the user input information.

In the present process, the window receiving the user input information may pack and send all the received data to an entity desiring to receive the keyboard input by the user, such as a server.

Process 506: The server removes the interference. The server calculates the interference information according to the hardware information and time information, to obtain the actual input information inputted by the user, such as a bank password.

The present process is to remove the interference data information in a secure environment, and may include several sub-processes below.

Sub-process 1: The security of the received data is verified based on the hardware information and time information in the received data, to prevent an attack such as a playback attack.

Sub-process 2: A result is calculated using an algorithm with the predetermined rule based on the hardware information and time information.

Sub-process 3: The algorithm and seed used for the current interference at the client is determined according to the result calculated.

Sub-process 4: The interference information is calculated.

Sub-process 5: The received information is compared with the calculated interference information to remove the portion of the received information that is the same as the calculated interference information, with the remaining portion of the received information being the actual input from the user.

Figure 6:
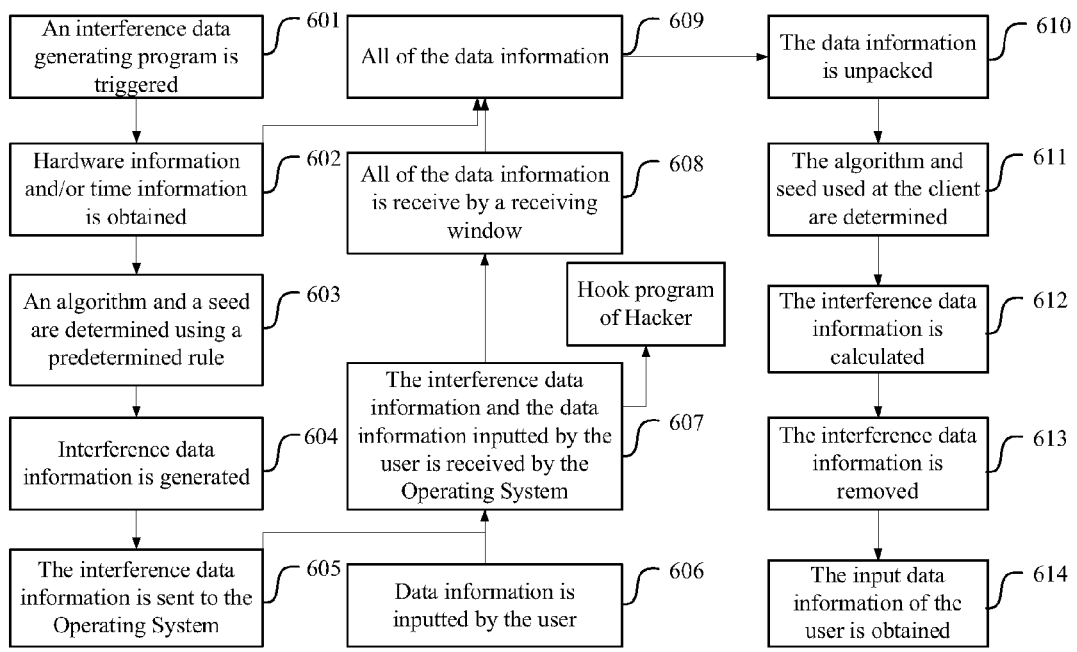
FIG. 6 is a schematic diagram showing alternative implementation of security processing of the input data according to an embodiment of the present invention.

FIG. 6 is a schematic diagram showing alternative implementation of security processing of the input data, which includes the following processes.

Process 601: An interference data generating program is triggered.

Process 602: Hardware information and/or time information is obtained.

Process 603: An algorithm and a seed are determined using a predetermined rule.

Process 604: Interference data information is generated.

Process 605: The interference data information is sent to the Operating System and process 607 is proceeded with.

Process 606: Data information is inputted by the user.

Process 607: The interference data information and the data information inputted by the user is received by the Operating System.

Process 608: All of the data information is receive by a receiving window.

Process 609: All of the data information, including the hardware information and/or time information in process 602, is packed and sent out.

Process 610: The data information is unpacked.

Process 611: The algorithm and seed used at the client are determined

Process 612: The interference data information is calculated.

Process 613: The interference data information is removed.

Process 614: The input data information of the user is obtained.

In view of the shown position in the flow where the Hook program from the hacker is executed, with the use of the method, it is possible to prevent effectively the hacker from obtaining the keyboard input, so that the information inputted by the user may be protected.

It will be appreciated by those skilled in the art that various modifications and alterations may be made to the invention without departing from the scope of the invention. Thus, if the various modifications and alterations fall in the scope of the invention defined in the appended claims and equivalents thereof, all the modifications and alterations are intended to be covered by the invention.

The invention claimed is:

1. A security processing method for input data, comprising:
generating interference data using a predetermined rule during inputting of user data through a data input device;
sending the interference data, after the interference data is generated, to a data receiving device; and
sending the user data, after the user data is inputted, to the data receiving device when the interference data is being sent;
wherein, a rate of generating the interference data is larger than a rate of inputting the user data; and
wherein an Operating System for data processing is installed in the data input device used for inputting user data, and
the generating interference data using the predetermined rule during inputting of user data through the data input device, sending the interference data, after the interference data is generated, to a data receiving device, and sending the user data, after the user data is inputted, to the data receiving device when the interference data is being sent comprises:
transmitting the user data, after the user data is inputted, to the Operating System;
generating the interference data using the predetermined rule during inputting of the user data and transmitting the interference data, after the interference data is generated to the Operating System; and
sending, by the Operating System, the user data and the interference data to the data receiving device.

2. The method of claim 1, wherein a rate of inputting the interference data into the Operating System is larger than a rate of inputting the user data into the Operating System.

3. The method of claim 1, further comprising:
obtaining hardware information of the data input device and/or input time when user data is inputted into the data input device; and
sending the hardware information of the data input device and/or the input time to the data receiving device when inputting of user data is completed; and wherein,
the interference data is generated using the predetermined rule according to the hardware information of the data input device and/or the input time.

4. The method of claim 3, further comprising:
after the user data, the interference data, the hardware information of the data input device and/or the input time are received by the data receiving device, parsing, the interference data using the predetermined rule according to the hardware information of the data input device and/or the input time.

5. The method of claim 1, further comprising:
parsing the interference data using the predetermined rule after the user data and the interference data are received by the data receiving device; and
separating the user data from the parsed interference data.

6. The method of claim 5, wherein separating the user data from the parsed interference data comprises:
comparing the parsed interference data with a mixture of the interference data and the user data; and
removing data that is the same as the interference data from the mixture to obtain the user data.

7. A security processing apparatus for input data, which is applicable to a data processing system including a data input device and a data receiving device, comprising an interference module and a data sending device, wherein
the interference module is configured to generate interference data using a predetermined rule during inputting of user data through the data input device; and
the data sending device is configured to send the interference data, after the interference data is generated by the interference module, to the data receiving device, and to send the user data, after the user data is inputted through the data input device, to the data receiving device when the interference data is being sent; and wherein, a rate of generating the interference data by the interference module is larger than a rate of inputting the user data; and
wherein an Operating System for data processing is installed in the data input device; and the data sending device includes a data transmission unit and an interference data transmission unit;

the data transmission unit is configured to transmit to the Operating System the user data after being inputted through the data input device;

the interference data transmission unit is configured to transmit the interference data generated using a predetermined rule to the Operating System; and the Operating System is configured to send the user data and the interference data to the data receiving device.

8. The security processing apparatus of claim 7, wherein a rate of inputting the interference data by the interference data transmission unit to the Operating System is larger than a rate of inputting the user data by the data transmission unit to the Operating System.

9. The security processing apparatus of claim 7, further comprising an acquiring module configured to acquire hardware information of the data input device and/or input time when user data is inputted through the data input device; and wherein, the interference module is further configured to generate the interference data using the predetermined rule according to the hardware information of the data input device and/or the input time; and the data sending device is further configured to send the hardware information of the data input device and/or the input time to the data receiving device when inputting of user data is completed.

10. The security processing apparatus of claim 9, further comprising a separating module configured to parse the interference data using the predetermined rule according to the hardware information of the data input device and/or the input time, after the user data, the interference data, and the hardware information of the data input device and/or the input time is received by the data receiving device.

11. The security processing apparatus of claim 7, further comprising a separating module configured to parse the interference data using the predetermined rule from a mixture of the user data and the interference data received by the data receiving device, and to separate the user data from the parsed interference data.

12. The security processing apparatus of claim 11, wherein the separating module comprises a parsing unit, a comparing unit and a separating unit;

the parsing unit is configured to parse the interference data from the mixture of the user data and the interference data received by the data receiving device using the predetermined rule;

the comparing unit is configured to compare the parsed interference data with the mixture; and the separating unit is configured to obtain the user data by removing data that is the same as the interference data and identified by the comparing unit, from the mixture.

* * * * *